June 17, 1930. F. A. REYNOLDS 1,765,310
CONTINUOUS FRUIT CUTTING AND SEED CELLING MACHINE
Filed Feb. 9, 1929 7 Sheets-Sheet 2

June 17, 1930. F. A. REYNOLDS 1,765,310
CONTINUOUS FRUIT CUTTING AND SEED CELLING MACHINE
Filed Feb. 9, 1929 7 Sheets-Sheet 3

INVENTOR.
Frank A. Reynolds
BY
Gardner W. Pearson
ATTORNEYS.

June 17, 1930. F. A. REYNOLDS 1,765,310
CONTINUOUS FRUIT CUTTING AND SEED CELLING MACHINE
Filed Feb. 9, 1929 7 Sheets-Sheet 4

June 17, 1930. F. A. REYNOLDS 1,765,310
CONTINUOUS FRUIT CUTTING AND SEED CELLING MACHINE
Filed Feb. 9, 1929 7 Sheets-Sheet 7

INVENTOR.
Frank A. Reynolds
BY
Gardner W. Pearson
ATTORNEYS.

Patented June 17, 1930

1,765,310

UNITED STATES PATENT OFFICE

FRANK A. REYNOLDS, OF LOWELL, MASSACHUSETTS, ASSIGNOR, BY MESNE ASSIGN-
MENTS, TO LOWELL MACHINE COMPANY, A CORPORATION OF MASSACHUSETTS

CONTINUOUS FRUIT-CUTTING AND SEED-CELLING MACHINE

Application filed February 9, 1929. Serial No. 338,869.

This invention relates to machines for rapidly and automatically removing or cutting out the seed cells from apples or similar fruit after they have been cored and preferably pared by other machines or devices.

Ordinarily the coring consists of cutting a hole right through the apple from stem to crown taking out both, and the larger part of the seeds and cells. However, on account of the shape of the seed cells, unless a very large coring hole is cut with the accompanying waste of the fruit, a certain number of seed cells are left in a ring around the center of the coring hole.

This invention is an improvement on the seed celling machine and process application for patent by this applicant, Frank A. Reynolds and Lucien F. L. Turcotte, filed April 7, 1926, Serial No. 100,336.

This machine is simplified and unnecessary parts abolished or others which are more simple substituted and the arrangement of the working parts, such as gears and cams, is such that they are less likely to be clogged up by the waste fruit, while the operator's hands are in less danger of being injured.

In the simplest form of the machine, the fruit is rested on top of quartering knives, by which term I mean any knives whether four or more or less, which extend out radially from center. Under these quartering knives are angular chutes each with a cutting slot through which a seed celling knife can pass.

A series of pushers are arranged to come down on top of the fruit and to push it through the quartering knives continuously down along the chutes dwelling at the point where the cutting knives cut out the seed cells, then continuing to push, preferably through other slicing knives, whereby as discharged the fruit is cut up into four, eight, twelve, or more segments, each with its seed cells cleanly cut out.

In the application above mentioned, provision was made for adjusting the pushers for different sizes of fruit, but the adjusting means rested against the side of the fruit. In this machine, in the preferred form, the adjusting means is set with reference to the height instead of the diameter of the fruit, and in this way I get more accurate results.

The motion of the segments are positive as the pushers force them gently along and I provide retarding or breaking means so that they will not jump out of the chutes, and will not slip ahead of the pushers.

By my preferred arrangement for feeding, the operators can use both hands and with each hand can slip a cored fruit on to the top of a rod guide and it will, by gravity, slip down and come to rest on top of the quartering knives just before the pushers come down on it to force it through.

Preferably also I provide releasing doors near the tops of the fruit guide rods on which the cored fruit is placed by the operator where it remains until the pushers have been lifted sufficiently to allow the fruit to slide down the rod beneath the pushers on to the quartering knives.

I can use this arrangement of pushers, quartering knives and feed rods for the purpose of cutting fruit into segments without the seed celling knives, if it is desirable so to do.

Preferably each of my machines has two sets of parts so that the operator can use both hands in feeding, and the ends of the fruit guide rods are up and away from the knives and pushers. Preferably also the working parts such as cams are away from the cutters and the delivery means are so arranged that the whole machine is clean and will not clog nor jam with mashed fruit.

In the drawings, Fig. 1 is an elevation from the front of the preferred form of my machine arranged with a complete double set of parts.

Figure 1:
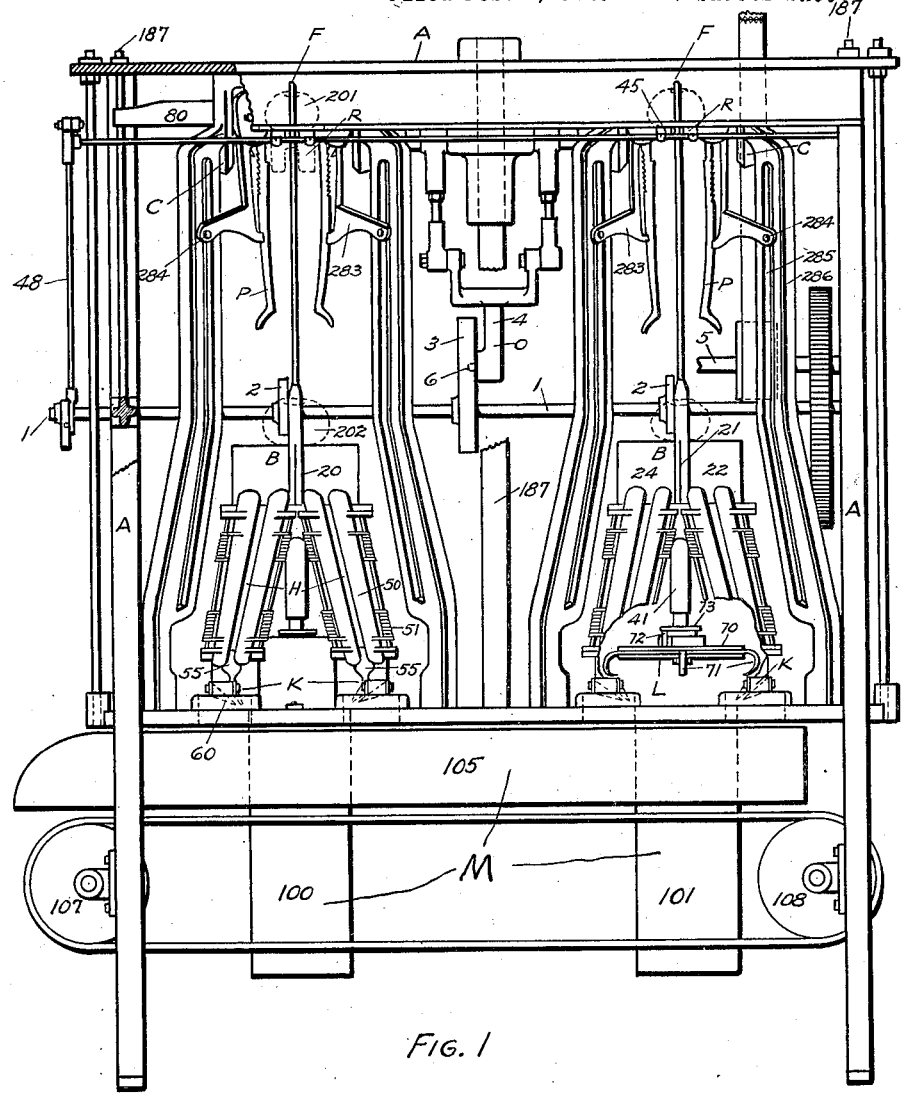

In all the views A represents the fixed frame of a machine in which are the fixed quartering knives B which include the four radially disposed blades 21, 22, 23, 24 which are preferably quite thin and sharp at the top. Obviously there may be three or more blades instead of four.

They are joined at the center 20 and from this extend upwardly and towards the front of the machine one or more fruit guide rods such as F. In every case, each of these guide rods is of a size so that a cored fruit can be slipped over the top and it will slide down quickly by gravity until it strikes the top of the knives.

Preferably the bottom, base or center spindle 20 projects a short distance above the knives and is of a size to about fit the cored hole in the fruit. By making it a tight fit or a loose fit, the impact of the fruit as it slides down the rod guide F by gravity can be changed, whereby the fruit will rest lightly on top of the knives, or sink in a substantial distance.

Extending down and away from and between the quartering knives are the angular chutes H. Each of these has at its angle, all in the same horizontal plane, a cutting slot 55.

I prefer also to locate below or at the bottom end of each chute H, a slicing cutter such as K which comprises several diverging blades such as 60 through which a segment of fruit, after passing through the chutes H, is further forced, thereby cutting the fruit into perhaps eight, twelve or sixteen minor segments.

L indicates a seed celling knife which, as shown, is actuated by mechanism indicated broadly by T which causes each seed celling blade 71 or the collection thereof indicated by L to reciprocate and to pass through a slot 55 at the proper time.

P represents a series of pushers, preferably pivoted at the top as to a cross beam 80 movable on vertical guides 187 and caused with the pushers to move up and down by the actuating mechanism indicated broadly by O.

Figure 2:
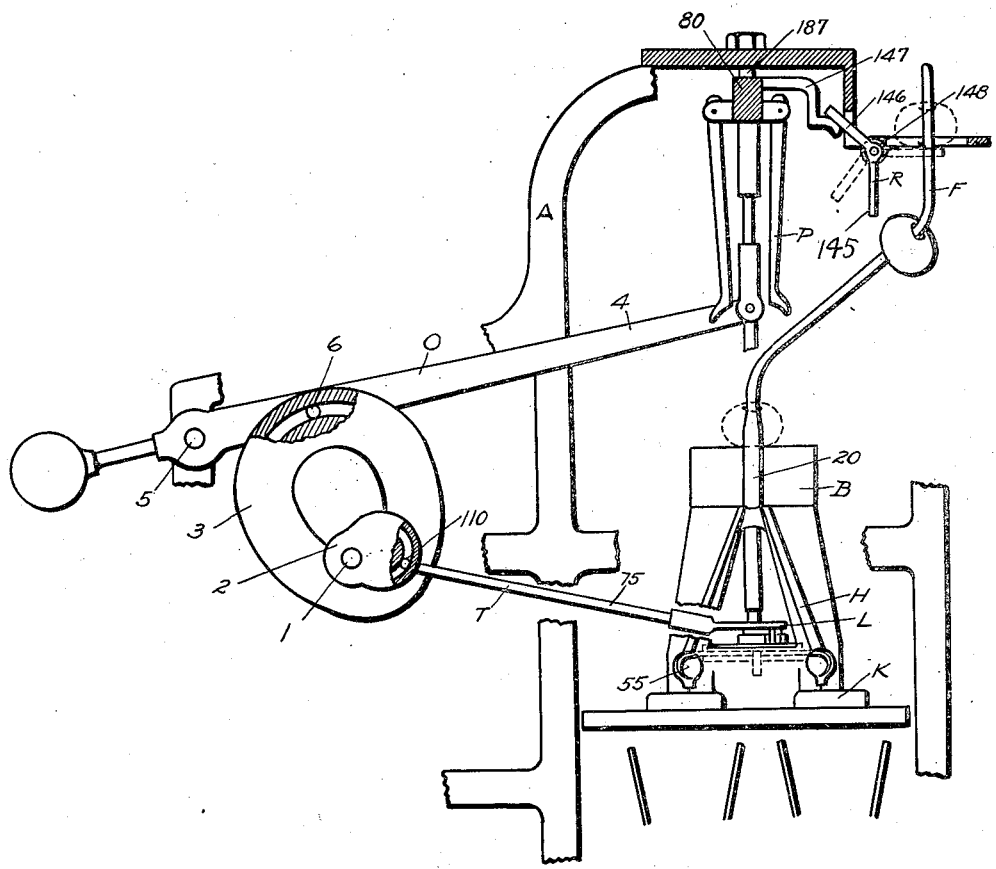
Fig. 2 is a diagrammatic side elevation showing a simplified and modified construction.
Figure 3:
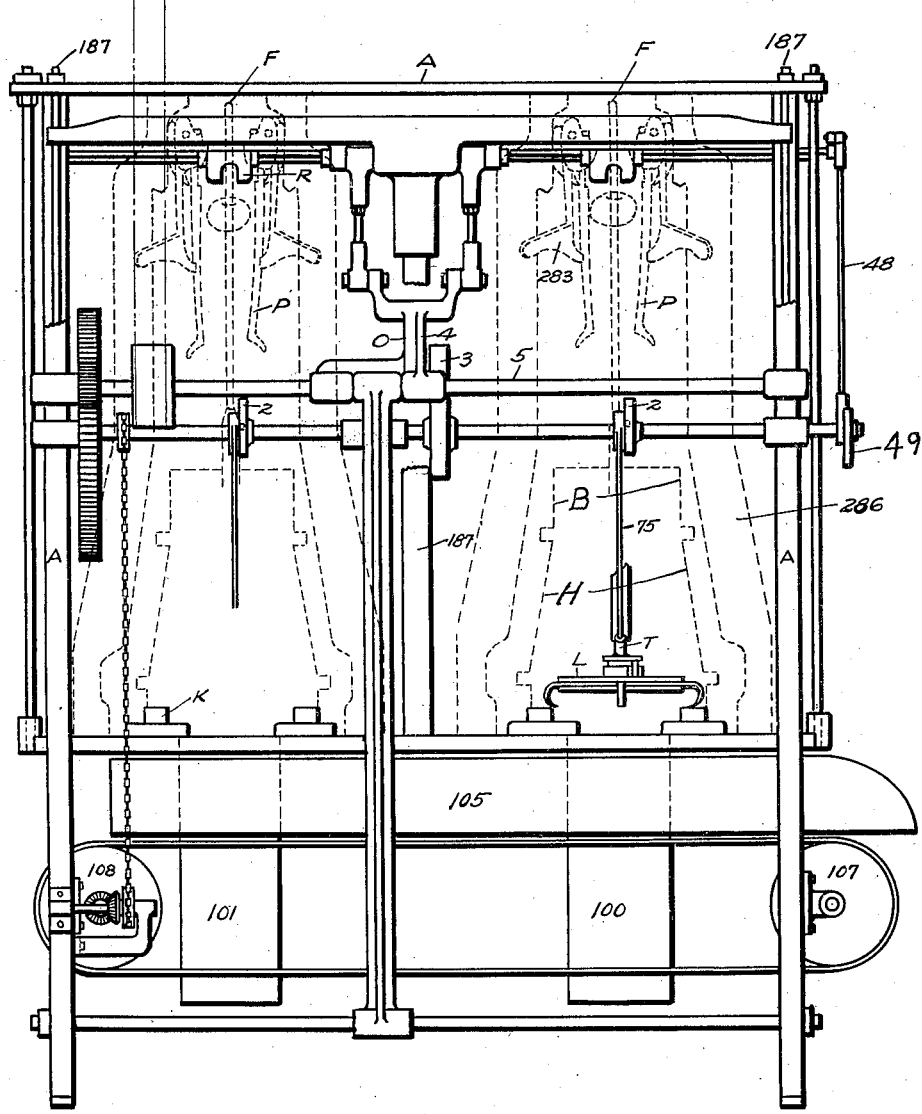
Fig. 3 is a back elevation with parts broken away of the machine shown in Fig. 1.

In the simplified construction shown in Fig. 2, each pusher leg is pivoted at the top and hangs freely by gravity so that when the pushers move down, their feet engage the fruit resting on the knives B and force it down through the knives, thus cutting it into segments and, continuing to push, force it down along the chutes H, and eventually through the slicing cutters K.

The operating mechanism O includes a rocker arm 4 pivoted to the frame at 5 and having a cam follower 6 which engages a slot in the operating cam 3 which is positioned near the top and back of the machine so as to be out of the way of the refuse, and is driven by the main driving shaft 1 which also drives a cam 2 which has a groove in which the cam follower 110 carried by rod 75 moves in such manner as to reciprocate the seed celling knife L.

R represents a fruit feed plate or door positioned near the top end of each feed rod F and normally held in position to retain any fruit, such as indicated at 201, which is placed thereon by the operative.

Figure 4:
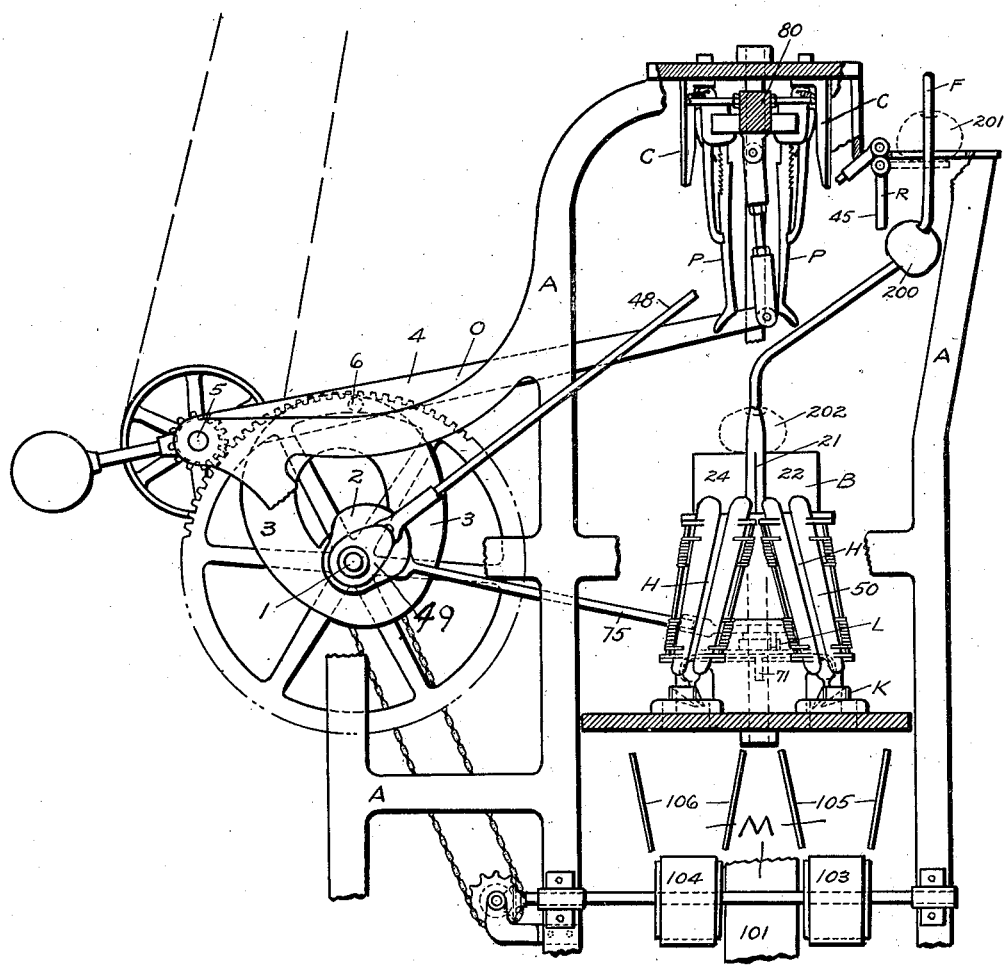
Fig. 4 is a side elevation from the right of Fig. 3 with various parts broken away to show the construction.

This feed plate or door is caused to drop when the pushers are at their top position, thus allowing the fruit to travel along from the position 201 to 200, and thence to 202 on top of the knives, as see Fig. 4.

In the construction shown in Fig. 2 this feed plate is ordinarily held in the up position by a spring 148, but the door 145 is opened when arm 147 carried by 80 strikes a tail 146.

In the construction shown in Fig. 4 the door such as 45 is opened and closed by means of a rod 48 which is moved at the proper time by cam 49 on drive shaft 1.

Preferably, to prevent the segments from kicking out of the chutes H, I provide suitable doors 50 which are normally spring pressed by springs 51 to act as brakes on the fruit segments as they come through.

Figure 6:
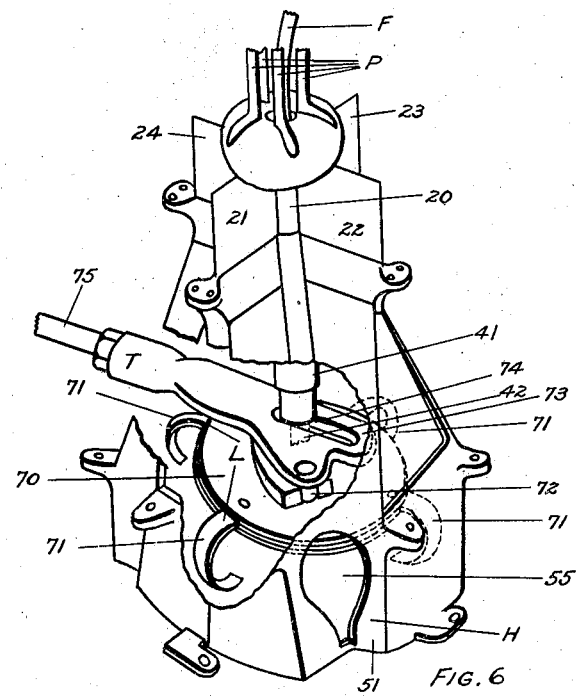
Fig. 6 is a detail in perspective showing the construction of the seed celling knife and adjoining parts.
Figure 7:
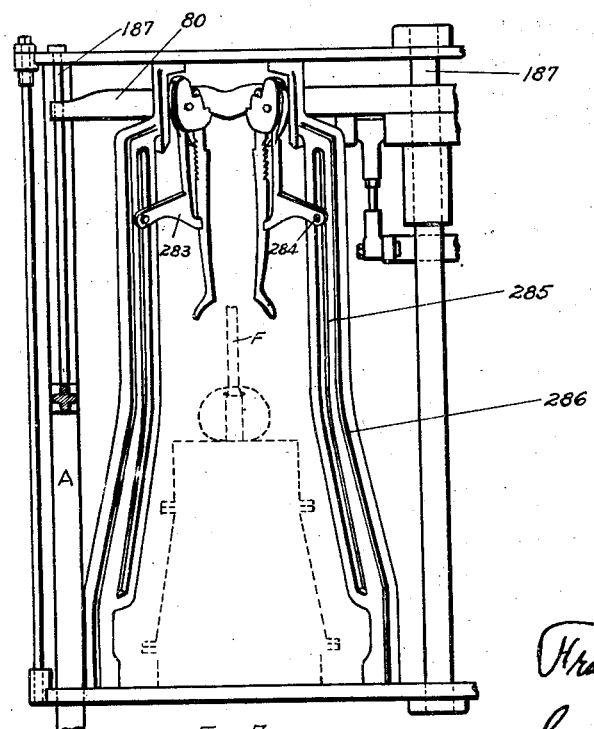
Fig. 7 is an elevation showing the construction of the pusher guides.

As shown in Fig. 6, the seed celling knife L is made up of a plurality of curved blades 71, 71 attached to a disc 70 which is caused to reciprocate by cam 2 and rod 75. Cams 2 and 3 are so cut that the pushers P dwell when the knives cut out the seed cells. Discs 70 is pivoted at 72 to a plate 73 having a slot 74 through which passes the fixed pivot 42 which, as shown, is part of an extension 41 of the base 20 of a fruit guide rod F.

The delivery mechanism, as indicated by M, includes chutes 100 and 101, directly under the middle of each set of four chutes H to receive the seed cells after they are cut out, the troughs 105 and 106, and the parallel endless belts 103 and 104 which are caused to travel along the bottom of the troughs 105 and 106 by means of the pulleys 107 and 108, such belts being positioned on each side of the chutes 100 and 101 in position to catch the finished segments, each taking care of the two adjoining chutes at the front or back.

As fruit, particularly apples, often vary considerably in size even in the same lot, and as the position of the seed cells depends mainly on the vertical size of the apple, I prefer to use pushers which can be adjusted and means to adjust them in accordance with the vertical diameter of the fruit.

Figure 5:
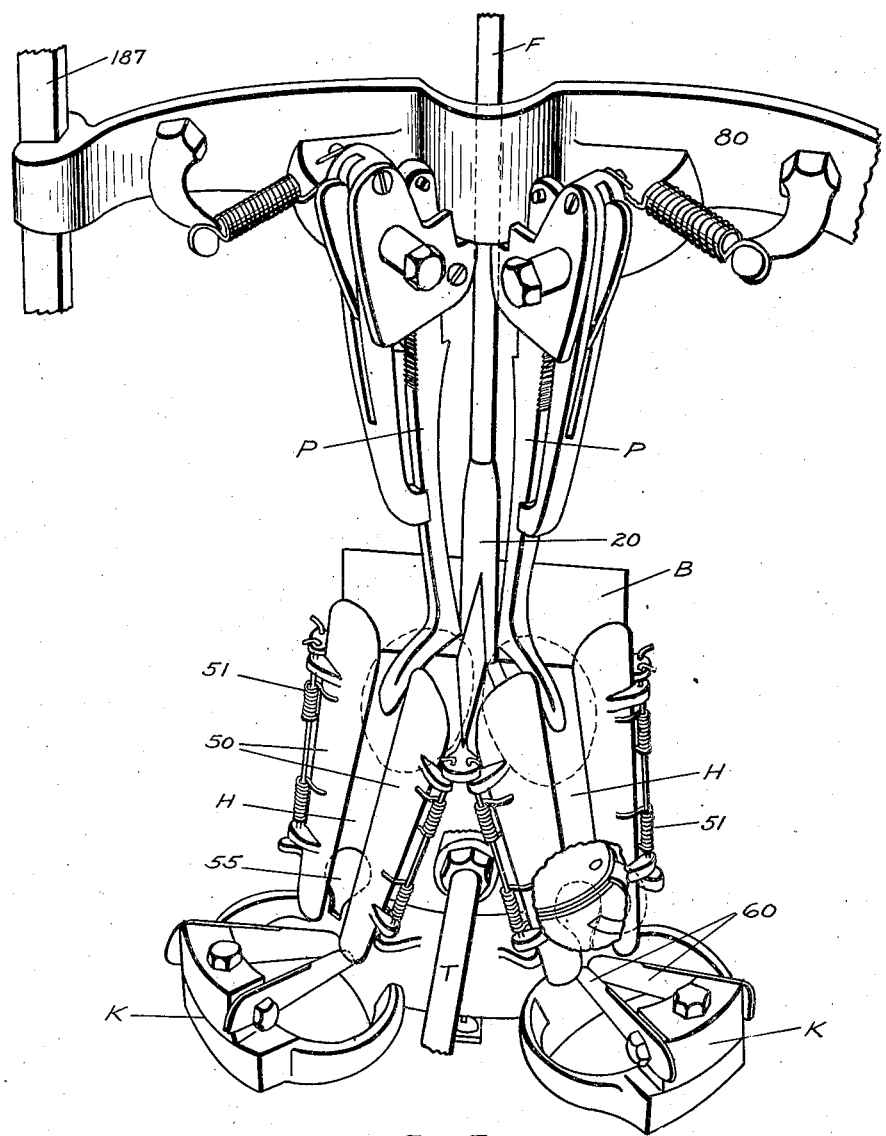
Fig. 5 is a detail view of the pushers, quartering knives, chutes and slicing knives shown in perspective.
Figure 8:
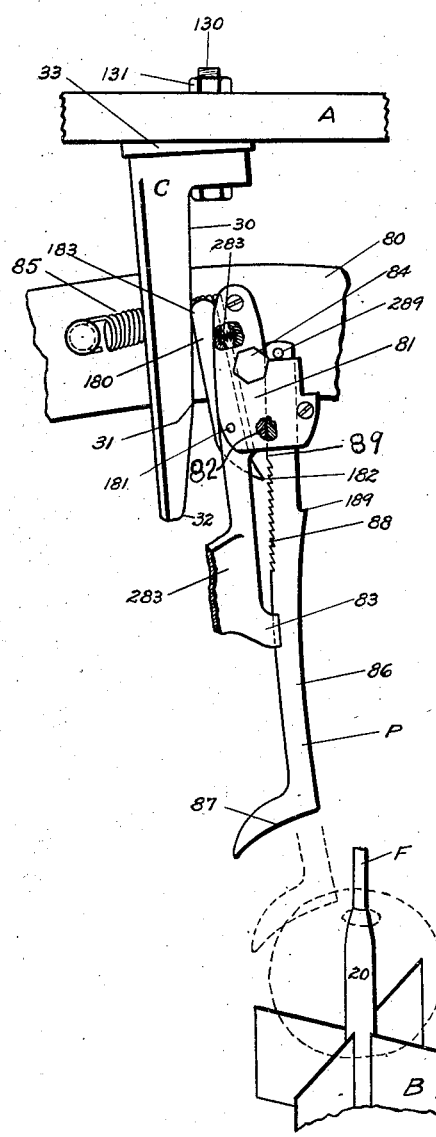
Figs. 8 and 9 are detail views partly in perspective showing different positions of the adjusting mechanism of the pushers.
Figure 9:
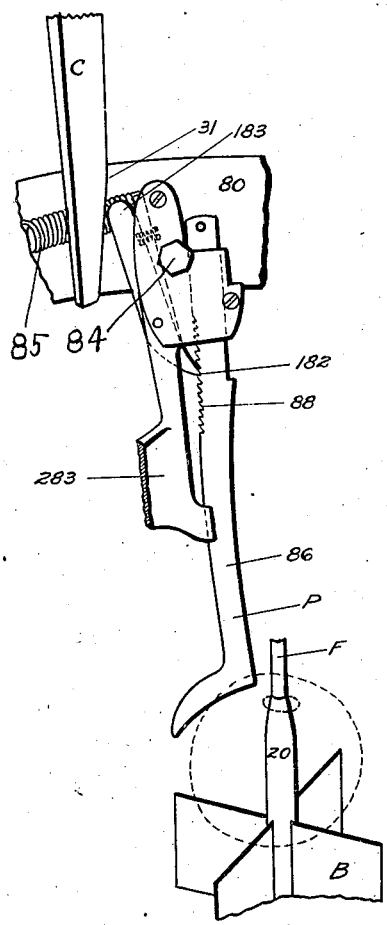

Such a construction, I show in detail in Figs. 5, 8 and 9.

Each of the series of pushers, such as P, comprises a frame 81 which includes a leg guide formed on portion 82 and an arm guide 83 through which the shank of a leg 86 having at the bottom a foot 87 can slide freely up and down.

This frame 81 is pivoted on the pivot 84 to the cross bar 80 which is movable vertically between the guides 187, 187. The frame 81 and each leg 86 is so pressed or pulled by the spring 85 as to cause the feet 87, 87 to tend to move towards each other.

The leg 86 is provided with teeth 88 which rake upward so as to engage the point 182 of a latch or pawl 180 when its tail 183 is released from the latch releasing guide C.

The part 89 of leg 86 is straight and smooth so that it can slide along the guideway 82 and ends in a stop 189 to limit its upward movement, and it also has a pin 289 to limit its downward movement.

When the pushers are lifted, the tails 183 strike inside the ends 32 of the latch releasing guides C and are forced inward up to the point 31 at which point, or before, the points 182 of the pawls or latches 180 are released from the teeth 88, allowing the legs 86 and the feet 87 to drop until stopped by the pins 289.

The part 30 of each guide C is relatively straight, and the points 182 are kept out of contact until the down stroke.

Preferably, the guides C are vertically adjustable as by means of shims or plates 33 which can be inserted between them and the top part of the frame A, they being held in place as by bolts 130 and nuts 131.

The adjustable pushers shown in Figs. 8 and 9 operate in the following manner:

When near the top, the latches 180 are out of engagement with the notches 88 and each leg 86 drops as far as allowed by its stop 289. As the pushers descend, each foot 87 finally rests on the top of the fruit. If the fruit is large, it rests at a higher point than if it is small.

The bar 80 continues to descend carrying with it the frames 81 and sliding the tails 183 of the latches 180 along the parts 30 of the guides C until they get beyond the points 31, whereupon, at a predetermined point, the points 182 will engage some part of the teeth 88, whereupon the legs 86 will be locked, and from that time will push down on the fruit as described.

If the fruit has a large vertical diameter, it will therefore start going down through the knives B quicker than if it has a small vertical diameter.

The pushers might be hung freely, as shown in Fig. 2 or they may be spring pressed by springs such as 85, but to avoid the wear of the heels of the feet 87 on the chutes H, I prefer to provide an extension 283 on each arm guide 83, or on some other part of the pusher, and to provide a guide pin 284 on 283 which travels in a groove 285 in a fixed guideway 286, whereby as the pushers move down, they are carried outward so that each foot just clears the angle of its respective chute, at the same time pushing the fruit segments along. This takes the place of the returning springs such as shown at 85, if desired, although I may use both together.

I claim:

1. In a fruit seed celling machine, the combination with a frame; of radial quartering knives attached to said frame; adjustable pusher latch releasing guides positioned above and equally spaced from the quartering knives; a fruit guide rod which extends from the centre of the quartering knives up and out; angular chutes which extend down and away from said quartering knives each chute having in the same horizontal plane a cutting slot and each having spring actuated fruit segment retaining doors to resiliently retain a segment of fruit in the chute; radially arranged slicing cutters positioned below the bottom end of each chute; a movable seed celling knife movable in a horizontal plane through the cutting slots; a series of pushers movable between the releasing guides and the chutes, having vertically slidable legs each being notched and having a foot in position to rest on top of the fruit and to push a segment thereof continuously down through the quartering knives along the chutes and through the slicing cutters permitting it to dwell while the seed celling knife is operated, each of said pushers having a spring pressed locking latch in position to engage a notch on a leg when released by the latch releasing guide; and means to move the pushers and seed celling knife as described.

2. In a fruit seed celling machine, the combination with a frame; of radial quartering knives attached to said frame; a fruit guide rod which extends up from the centre of the quartering knives; angular chutes which extend down and away from said quartering knives each chute having in the same horizontal plane a cutting slot and each having means to resiliently retain a section of fruit in the chute; radially arranged slicing cutters positioned below the bottom end of each chute; a movable seed celling knife movable in a horizontal plane through the cutting slots; a series of pushers movable through the quartering knives and the chutes, each having a foot adapted to rest on top of the fruit and to push a segment thereof continuously down through the quartering knives along the chutes and through the slicing cutters permitting it to dwell while the seed celling knife is operated; and means to move the pushers and seed celling knife as described.

3. In a fruit seed celling machine, the combination with a frame; of radial knives attached to said frame; a fruit guide rod which extends up and away from the centre of the knives; angular chutes which extend down from said knives each chute having in the same horizontal plane a cutting slot; a seed celling knife movable in a horizontal plane through the cutting slots; a series of pushers each movable through and between two radial knives and into the chutes, each having a foot adapted to rest on top of the fruit and to push a segment thereof continuously down through the knives along the chutes permitting it to dwell while the seed celling knife is operated; and means to move the pushers and seed celling knife as described.

4. In a fruit seed celling machine, the combination with a frame; of radial knives attached to said frame; adjustable pusher latch releasing guides attached to the frame and equally spaced from the radial knives; a fruit guide rod which has an enlargement at the bottom and is fixed to the center and top of the radial knives and then extends up and thence of smaller size up and away from said center; angular chutes which extend down from said knives, each chute having a cutting slot; seed cell cutting means, adapted to pass through said slots; a series of pushers each movable through and between two radial knives and into the chutes, each having a frame in which is slidable a leg having notches and a foot adapted to rest on top of the fruit when the fruit rests on the radial knives and having a latch normally spring pressed to engage said notches, said latch being slidable along one of said latch releasing guides and being held out of engagement with said notches until released therefrom; means to operate the seed celling means; and means to move the pushers down through the radial knives and along the chutes and to permit them to dwell while the seed cell cutting means is operating.

5. In a fruit seed celling machine, the combination with a frame; of radial knives attached to said frame; pusher latch releasing guides attached to the frame and spaced from the radial knives; a fruit guide rod fixed to the center and top of the radial knives; angular chutes which extend down from said knives each chute having a cutting slot; seed cell cutting means adapted to pass through said slots; a series of pushers each movable through and between two radial knives and into the chutes, each having a frame in which is slidable a leg having notches and a foot adapted to rest on top of the fruit when the fruit rests on the radial knives and having a latch normally spring pressed to engage said notches, said latch being slidable along one of said latch releasing guides and being held out of engagement with said notches until released therefrom; means to operate the seed celling means; and means to move the pushers down through the radial knives and along the chutes and to permit them to dwell while the seed cell cutting means is operating.

6. In a fruit seed celling machine, the combination with a frame; of radial knives attached to said frame midway between the top and bottom; a fruit feed guide rod which extends from the center of the knives up to the front and top of the frame; angular chutes which extend down and radially outward from the center of said knives each chute having a cutting slot; a seed celling knife movable through the cutting slots; a series of pushers each movable through and between two radial knives from a position well above the knives into the chutes and down proximate the lower end thereof, each pusher having a foot adapted to rest on top of the fruit and to push a segment thereof continuously down through the knives along the chutes permitting it to dwell while the seed celling knife is operated; a fruit feed plate proximate said guide rod adapted to drop when the pushers are at their top position; means including a drive shaft and a cam shaft positioned near the top and back of the frame to move the pushers, the feed plate and seed celling knife as described; together with a waste chute positioned centrally under and inside the lower ends of the chutes, and delivery belts positioned under and outside the lower end of the chutes.

7. In a fruit seed celling machine, the combination with a frame; of radial knives attached to said frame midway between the top and bottom; a fruit feed guide rod which extends from the center of the knives up to the front and top of the frame; angular chutes which extend down and radially outward from the center of said knives each chute having a cutting slot; a seed celling knife movable through the cutting slots; a series of pushers each movable through and between two radial knives from a position well above the knives into the chutes and down proximate the lower end thereof, each pusher having a foot adapted to rest on top of the fruit and to push a segment thereof continuously down through the knives along the chutes permitting it to dwell while the seed celling knife is operated; and means including a drive shaft and a cam shaft positioned near the top and back of the frame to move the pushers and seed celling knife as described.

8. In a fruit seed celling machine, the combination with a frame; of radial knives attached to said frame; a fruit guide rod which extends up and away from the centre of the knives; angular chutes which extend down from said knives each chute having a cutting slot; a seed celling knife movable through the cutting slots; diverging slicing cutters positioned at the discharge end of each chute; a series of pushers each movable through and between two radial knives and into the chutes, each having a foot adapted to rest on top of the fruit and to push a segment thereof continuously down through the knives along the chutes permitting it to dwell while the seed celling knife is operated, and through the slicing cutters; and means to move the pushers and seed celling knife as described.

9. In a fruit seed celling machine, the combination with a frame; of radial knives attached to said frame; a fruit guide rod which extends up and away from the centre of the knives; angular chutes which extend down from said knives each chute having a cutting slot; a seed celling knife movable through the cutting slots; a series of adjustable pushers each movable through and between two radial knives and into the chutes, each having a foot adapted to rest on top of the fruit and to push a segment thereof continuously down through the knives along the chutes permitting it to dwell while the seed celling knife is operated; means to adjust the pushers in accordance with the diameter of the fruit; and means to move the pushers and seed celling knife as described.

10. In a fruit seed celling machine, the combination with a frame; of radial knives attached to said frame; a fruit guide rod which extends up and away from the centre of the knives; angular chutes which extend down from said knives each chute having a cutting slot; a seed celling knife movable through the cutting slots; a series of pushers each movable through and between two radial knives and into the chutes, each having a foot adapted to rest on top of the fruit and to push a segment thereof continuously down through the knives along the chutes permitting it to dwell while the seed celling knife is operated; guides for the pushers as they pass along the chutes; and means to move the pushers and seed celling knife as described.

11. In a fruit seed celling machine, the combination with a frame; of radial knives attached to said frame midway between the top and bottom; a fruit feed guide rod which extends from the center of the knives up to the front and top of the frame; angular chutes which extend down and radially outward from the center of said knives each chute having a cutting slot; a seed celling knife movable through the cutting slots; a series of pushers each movable through and between two radial knives from a position well above the knives into the chutes and down proximate the lower end thereof, each pusher having a foot adapted to rest on top of the fruit and to push a segment thereof continuously down through the knives along the chutes permitting it to dwell while the seed celling knife is operated; a fruit feed plate proximate said guide rod adapted to drop when the pushers are at their top position; and means to move the pushers, the feed plate and seed celling knife as described.

12. In a fruit seed celling machine, the combination with a frame; of radial knives attached to said frame midway between the top and bottom; a fruit feed guide rod which extends from the center of the knives up to the front and top of the frame; angular chutes which extend down from the center of said knives; slicing cutters positioned at the lower end of each chute; a series of pushers each movable through and between two radial knives from a position above the lower end of the feed guide rod into the chutes, each pusher having a foot adapted to rest on top of the fruit and to push a segment thereof continuously down through the knives along the chutes and through the slicing cutters; a fruit feed plate proximate the upper end of said fruit feed guide rod; and means to move the pushers and to drop the feed plate when the pushers are at their top position.

13. In a fruit treating machine, the combination with a frame; of radial knives attached to said frame midway between the top and bottom; a fruit feed guide rod which extends from the center of the knives up to the front and top of the frame; a series of pushers each movable through and between two radial knives from a position above the lower end of the feed guide rod, each pusher having a foot adapted to rest on top of the fruit and to push a segment thereof continuously down through the knives; a fruit feed plate proximate the upper end of said fruit feed guide rod; and means to move the pushers and to drop the feed plate when the pushers are at their top position.

FRANK A. REYNOLDS.